United States Patent Office 3,274,201
Patented Sept. 20, 1966

3,274,201
2-LOWER ALKYL 1,2,3,4,4a,9a-HEXAHYDRO-9H-INDENO[2,1-c]PYRIDINES
Marshall D. Draper, Woodland Hills, Calif., assignor to Rexall Drug and Chemical Company, Los Angeles, Calif., a corporation of Delaware
No Drawing. Filed Aug. 12, 1965, Ser. No. 479,290
9 Claims. (Cl. 260—290)

This application is a continuation-in-part of my application entitled "Substituted Indenopyridines and Process Therefor," Serial No. 310,915, now abandoned, filed September 23, 1963.

This invention relates to compositions of matter classified in the art of chemistry as substituted indenopyridines and to intermediates obtained in the synthesis thereof.

The invention sought to be patented, in a final product composition aspect, resides in the concept of a chemical compound having a molecular structure in which the 1,2,3,4,4a,9a-hexahydro-9H-indeno[2,1-c]pyridine nucleus bears at the 4a-position a phenyl radical and at the 2-position (nitrogen atom) a lower alkyl or lower cycloalkyl radical, and the hereinafter described equivalents thereof.

The invention sought to be patented, in an intermediate composition aspect, resides in the concept of a substituted chemical compound having a molecular structure in which the 1,2,5,6-tetrahydropyridine nucleus bears at the 1-position (nitrogen atom) a lower alkyl or lower cycloalkyl radical, at the 3-position a benzyl radical and at the 4-position a phenyl radical, and the hereinafter described equivalents thereof.

As used throughout the application the terms "lower alkyl" and "lower alkoxy" embrace both straight and branched chain alkyl and alkoxy radicals, respectively, containing from 1 to 6 carbon atoms, for example methyl ethyl, n-propyl, isopropyl, n-butyl, tert-butyl, n-amyl, sec-amyl, n-hexyl, 2-ethylbutyl, 2,3-dimethylbutyl and the like in the case of "lower alkyl" and methoxy, ethoxy, propoxy, isopropoxy, n-butoxy, n-amoxy, tert-butoxy, sec-amoxy, n-hexyloxy, 2-ethylhexyloxy, 2,3-dimethylhexyloxy and the like in the case of "lower alkoxy," and the term "lower cycloalkyl" embraces cycloalkyl or lower alkyl substituted cycloalkyl radicals containing from 3 to 9 carbon atoms, for example cyclopropyl, cyclobutyl, cyclopentyl, cyclohexyl, cycloheptyl, cyclooctyl, cyclononyl, methylcyclopentyl, ethylcyclohexyl and the like.

The tangible embodiments of this invention, in both its final product and intermediate composition aspects, possess the inherent general physical properties of being solid crystalline materials. Spectral data and elemental analyses, taken together with the aforementioned physical properties, nature of the starting materials and modes of synthesis, positively confirm the structure of the compounds sought to be patented.

The tangible embodiments of this invention, in its final product composition aspect, possess the inherent applied use characteristics of having significant pharmacological activity without adverse toxicity as central nervous system depressants and analgesic, anticholinergic and antihistaminic agents as determined by recognized and accepted pharmacological test procedures.

The tangible embodiments of this invention, in its intermediate composition aspect, possess the inherent applied use characteristics of being useful and valuable as chemical intermediates in the preparation of the tangible embodiments of this invention in its final product composition aspect by a reaction sequence hereinafter to be described.

The manner and process of making and using the invention will now be generally described so as to enable one skilled in the art of chemistry to make and use the same as follows:

The reaction sequence leading to the tangible embodiments of this invention in its intermediate and final product composition aspects is set forth as follows:

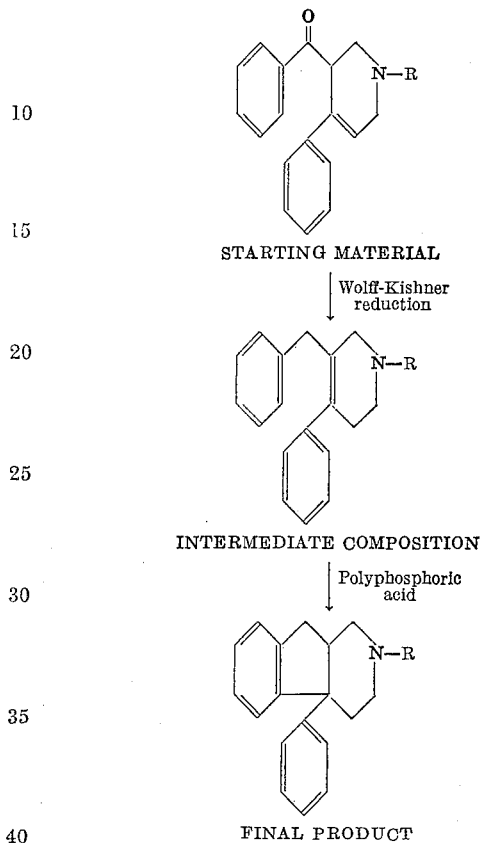

wherein R is lower alkyl or lower cycloalkyl.

The starting materials depicted hereinabove are readily prepared by known chemical processes, for example by dehydration of a 1-lower alkyl-3-benzoyl-4-hydroxy-4-phenylpiperidine by heating with acetic anhydride and sulfuric acid. Starting materials wherein the phenyl radical at the 4-position is nuclearly substituted and/or the benzoyl group at the 3-position is additionally substituted with one or more lower alkyl, lower alkoxy, trifluoromethyl, halogen and the like groups are prepared by analogous processes and are the full equivalents of the specific 1-lower alkyl-3-benzoyl-4-phenyl-1,2,3,6 - tetrahydropyridine starting materials depicted hereinabove. Their use in the foregoing reaction sequence results in the preparation of intermediate and final product compositions having the same utility as the specific intermediate and final product compositions depicted hereinabove.

The first step in the reaction sequence depicted above resides in subjecting the starting material to a Wolff-Kishner reduction in accordance with the generally recognized conditions for this reaction. The starting material is refluxed with anhydrous hydrazine, excess hydrazine removed by distillation and the hydrazone derivative is decomposed with alkali, for example potassium hydroxide, sodium methoxide, potassium ethoxide and the like to yield the intermediate.

The second step in the reaction sequence comprises the treatment of the intermediate with polyphosphoric acid at elevated temperatures not exceeding 150° C. to effect the desired ring closure. Temperatures between 100° C. and 150° C. are desirable with a temperature of about 130° C. being preferred. A reaction time of 12 to 24 hours is normally required. At the conclusion of the reaction, aqueous base is added and the final product is recovered by extraction and crystallization.

An alternate reaction sequence leading to the tangible embodiments of the invention in its final product composition aspect is set forth as follows:

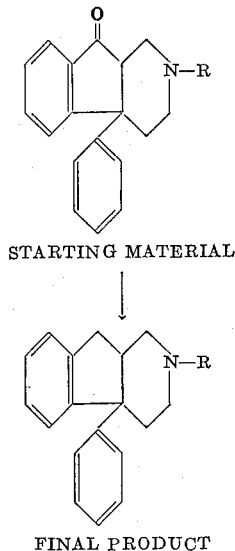

STARTING MATERIAL

↓

FINAL PRODUCT wherein R is lower alkyl or lower cycloalkyl.

The starting materials for preparing the final products according to this alternate reaction sequence are substituted 9 - oxo - 1,2,3,4,4a,9a-hexahydro-9H-indeno[2,1-c]-pyridines which are described and claimed in my application 479,335 entitled "Substituted Indenopyridines and Process of Making and Using Same," filed August 12, 1965. Such starting materials are formed by treating appropriate N-lower alkyl or N-lower cycloalkyl-3-oxo-1-phenyl-1-indanacetamides with lithium aluminum hydride to form a mixture of 3-oxo- and 3-hydroxy-N-lower alkyl or N-lower cycloalkyl-1-phenyl-indan-ethylamine and then converting the 3-hydroxy compound to the 3-oxo compound by treatment with chromium trioxide and sulfuric acid (Jones reagent). The 3-oxo compound is then converted to the starting materials for the alternate reaction sequence by treatment with formaldehyde or its equivalents such as paraformaldehyde or other lower aliphatic aldehydes such as acetaldehyde, at reflux temperature in an inert solvent reaction medium. Useful inert solvents include tetrahydrofuran, ethanol and mixtures thereof. Acidic conditions are maintained by the presence of a mineral acid such as hydrochloric acid, sulfuric acid and the like or a carboxylic acid such as oxalic acid. The desired degree of acidity can be maintained by use of an acid salt of the starting material in the reaction mixture. After recovery by conventional techniques of crystallization, the 9-oxo compound (the starting material for the alternate reaction sequence) is subjected to the well-known Wolff-Kishner reduction wherein the 9-oxo compound is refluxed with hydrazine to form the corresponding hydrazone which is then refluxed with an alkali metal hydroxide or alkali metal lower alkoxide, such as potassium ethoxide, sodium isopropoxide, potassium t-butoxide and the like in the presence of an inert solvent such as toluene, xylene and the like thereby to form the tangible embodiments of this invention in its final product composition aspect. While the Wolff-Kishner reduction is preferred, other well-known reduction methods may also be employed, for example the Clemmensen reduction (amalgamated zinc and hydrochloric acid). The final product is recovered by conventional techniques of isolation and crystallization.

Starting materials for the alternate reaction sequence wherein the benzene ring of the indane portion of the compound bears one or more additional lower alkyl, lower alkoxy, halogen or trifluoromethyl groups and/or wherein the phenyl substituent bears one or more lower alkyl, lower alkoxy, halogen or trifluoromethyl groups are prepared by the same techniques set forth hereinabove and my concurrently filed application referred to hereinabove and are the full equivalents to the specific starting materials depicted in the alternate reaction sequence. Their use in the above-described reaction sequence results in the preparation of final products having alkyl, alkoxy, halogen or trifluoromethyl substituents on the benzene rings at the same position as in the starting materials, such final products having the same utility as the specific products depicted in the above-described alternate reaction sequence.

The tangible embodiments of this invention can, if desired, be converted into their non-toxic pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially those with hydroxy organic acids and dibasic acids, such as citrate, tartrate, malate and maleate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexyl bromide and the like. Such pharmaceutically useful acid-addition and quaternary ammonium salts are the full equivalents of the bases from which they are derived and are included within the scope of this invention.

The tangible embodiments of this invention, either as free bases or in the form of a non-toxic pharmaceutically acceptable acid-addition or quaternary ammonium salt, can be combined with conventional pharmaceutical diluents and carriers to form such dosage forms as tablets, suspensions, solution, suppositories and the like.

The best mode contemplated by the inventor of carrying out this invention will now be set forth as follows:

The following example illustrates the preparation of the tangible embodiments of this invention in its intermediate composition aspect:

EXAMPLE 1

*3-benzyl-1-methyl-4-phenyl-1,2,5,6-tetrahydropyridine hydrochloride*

Reflux 3-benzoyl-1-methyl-4-phenyl-1,2,3,6-tetrahydropyridine (3.0 g., 0.0108 mole) for one hour with anhydrous hydrazine (20 ml.). Remove the excess hydrazine in vacuo and dry the product of the reaction for one hour at 60° C. and 1 mm. Hg. Suspend the dried hydrazone (2.75 g.) in triethylene glycol (30 ml.) and add sodium methoxide (3 g.). Heat the mixture to 190° C. until gas evolution ceases. Cool the mixture and add water (30 ml.). Extract 4 times with ether (25 ml. portion). Combine the ether extracts, wash with water (25 ml.) and dry over anhydrous magnesium sulfate. Remove the ether from the filtrate in vacuo to yield a brown oil. Dissolve the oil in anhydrous ether, bubble in anhydrous hydrogen chloride gas and recover the product in the form of a precipitate. Recrystallize the hydrochloride from methanol-ether to give 1.4 g. (43%) of product, M.P. 257–258° C.

*Analysis.*—Calculated for $C_{19}H_{22}NCl$: C, 76.10%; H, 7.39%; N, 4.67%. Found: C, 76.23%; H, 7.47%; N, 4.70%.

The following example illustrates the preparation of the tangible embodiments of this invention in its final product composition aspect by reduction of the tangible embodiments of this invention in its intermediate composition aspect:

EXAMPLE 2

*2-methyl-4a-phenyl-1,2,3,4,4a,9a-hexahydro-9H-indeno[2,1-c]pyridine*

Heat a mixture of 3-benzyl-1-methyl-4-phenyl-1,2,5,6-tetrahydropyridine (3.5 g., 0.0133 mole), prepared as described in Example 1, and polyphosphoric acid (40 ml.) at 130° C. for 24 hours. Add ice and water to the reaction mixture and make the aqueous solution basic with ammonium hydroxide. Extract the solution three times with ether (50 ml. portions), combine the ether extracts, wash with water, dry over anhydrous magnesium sulfate and evaporate to dryness to yield 2.5 g. Dissolve the residue in chloroform and pass the solution through a 50 ml. acid washed alumina column to yield 1.6 g. (45.5%) of a mixture of racemates. Separate the racemates through their respective picrate salts:

Racemate A: M.P. 185°–186.5° C.

*Analysis.*—Calculated for $C_{25}H_{24}N_4O_7$: C, 60.97%; H, 4.91%; N, 11.38%. Found: C, 61.40%; H, 4.97%; N, 10.81%.

Racemate B: 0.08 g., M.P. 223°–224.5° C.

*Analysis.*—Calculated for $C_{25}H_{24}N_4O_7$: C, 60.97%; H, 4.91%; N, 11.38%. Found: C, 61.07%; H, 4.81%; N, 11.13%.

Analysis of the oxalate salt of Racemate A.—Calculated for $C_{21}H_{23}NO_4$: C, 70.55%; H, 6.48%; N, 3.97%; Found: C, 71.25%; H, 6.56%; N, 3.97%.

The following example illustrates the preparation of tangible embodiments of this invention in its final product composition aspect by means of the alternate reaction sequence, utilizing a Wolff-Kishner reduction:

EXAMPLE 3

*6-methoxy-2-methyl-4a-phenyl-1,2,3,4,4a,9a-hexahydro-9H-indeno[2,1-c]pyridine*

9 - oxo - 6-methoxy-2-methyl-4a-phenyl - 1,2,3,4,4a,9a-hexahydro-9H-indeno[2,1-c]pyridine (3.0 g.) is placed in 97% anhydrous hydrazine (50 ml.). The mixture is refluxed for 18 hours, the excess hydrazine removed in vacuo and then triethylene glycol (25 ml.) and potassium hydroxide (3.0 g. pellets) added. This mixture is heated at 180° C. for about 3 hours. The mixture is cooled, water (50 ml.) added and extracted with ether. The ether extracts are successively washed with water and extracted with 1 N hydrochloric acid and the HCl extract basified with sodium hydroxide and extracted with ether. The ether extracts are washed with water, dried and the ether removed in vacuo to yield 2.8 g. product.

The following examples illustrate the preparation of tangible embodiments of this invention in its final product composition aspect by means of the alternate reaction sequence, utilizing at Clemmensen reduction:

EXAMPLE 4

*2-propyl-4a-phenyl-1,2,3,4,4a,9a-hexahydro-9H-indeno[2,1-c]pyridine*

2 - propyl - 9 - oxo-4a-phenyl-1,2,3,4,4a,9a - hexahydro-9H-indeno[2,1-c]pyridine oxalate (3.2 g., 0.0105 mole) is dissolved in methanol (30 ml.) and hydrochloric acid (12 N, 5 ml.) and water (30 ml.) is added. The mixture is heated and sufficient methanol is added to produce a clear solution. Granulated zinc (15 g.), mercuric chloride (1.5 g.) and concentrated hydrochloric acid (25 ml.) are added and the mixture is refluxed for 4 hours. An additional 25 ml. of 12 N hydrochloric acid is then added and refluxing continued for 18 more hours. The methanol is removed. The product crystallizes upon cooling and is recovered by filtration. The crystals are purified and converted to the free base and then to the hydrochloride salt which is recovered in a yield of 2.58 g., M.P. 145–148° C.

*Analysis.*—Calculated for $C_{21}H_{25}N \cdot \frac{1}{2}H_2O \cdot HCl$: C, 74.86%; H, 8.08%; N, 4.16%; Cl, 10.52%. Found: C, 74.52%; H, 7.91%; N, 4.27%; Cl, 10.33%.

EXAMPLE 5

*2-cyclopropyl-4a-phenyl-1,2,3,4,4a,9a-hexahydro-9H-indeno[2,1-c]pyridine*

2-cyclopropyl - 9 - oxo-4a-phenyl - 1,2,3,4,4a,9a - hexahydro-9H-indeno[2,1-c]pyridine picrate (5.0 g., 0.017 mole) in methanol (100 ml.) and 12 N hydrochloric acid (50 ml.) are added to an amalgam prepared from granulated zinc (50 g.) and mercuric chloride (5 g.) and the mixture is refluxed for 3 hours. An additional 25 ml. of 12 N hydrochloric acid is then added and the refluxing continued for another 3 hours. The product crystallizes upon cooling and is recovered by filtration. The product is then dissolved in methanol to separate unreacted amalgam. The methanol is removed under reduced pressure and the residue converted to the free base by treatment with concentrated ammonium hydroxide and extracted with ether. Work-up yields 4.48 g. of a mixed product which is separated on an acid washed alumina column into two racemates which were converted to the hydrochloride salt for analysis:

Racemate A: Yield 1.25 g., M.P. 146°–148° C.

*Analysis.*—Calculated for $C_{21}H_{34}NCl \cdot \frac{1}{2}H_2O$: C, 75.32%; H, 7.52%; N, 4.18%; Cl, 10.58%. Found: C, 75.19%; H, 7.86%; N, 3.76%; Cl, 10.39%.

Racemate B: Yield 1.22 g., M.P. 123°–125° C.

*Analysis.* — Calculated for $C_{21}H_{34}NCl \cdot \frac{1}{2}H_2O$: C, 75.32%; H, 7.52%; N, 4.18%; Cl, 10.58%. Found: C, 75.50%; H, 7.80%; N, 3.67%; Cl, 10.61%.

The subject matter which the applicant regards as his invention is particularly pointed out and distinctly claimed as follows:

1. 2 - lower alkyl - 4a-phenyl-1,2,3,4,4a,9a-hexahydro-9H-indeno[2,1-c]pyridine.
2. 2-methyl-4a-phenyl-1,2,3,4,4a,9a - hexahydro - 9H-indeno[2,1-c]pyridine.
3. 2 - propyl - 4a - phenyl-1,2,3,4,4a,9a-hexahydro-9H-indeno[2,1-c]pyridine.
4. 6-methoxy-2-methyl-4a-phenyl - 1,2,3,4,4a,9a - hexahydro-9H-indeno[2,1-c]pyridine.
5. 2 - lower cycloalkyl-4a-phenyl-1,2,3,4,4a,9a-hexahydro-9H-indeno[2,1-c]pyridine.
6. 2-cyclopropyl-4a-phenyl - 1,2,3,4,4a,9a - hexahydro-9H-indeno[2,1-c]pyridine.
7. 3 - benzyl-1-lower alkyl-4-phenyl-1,2,5,6-tetrahydropyridine.
8. 3 - benzyl-1-methyl-4-phenyl-1,2,5,6-tetrahydropyridine.
9. 3 - benzyl-1-lower cycloalkyl-4-phenyl-1,2,5,6-tetrahydropyridine.

References Cited by the Examiner

UNITED STATES PATENTS 2,546,652  3/1951  Plati et al. _____ 260—294.7

WALTER A. MODANCE, *Primary Examiner.*

A. D. SPEVACK, *Assistant Examiner.*